US008036926B2

(12) United States Patent
McBrearty et al.

(10) Patent No.: US 8,036,926 B2
(45) Date of Patent: Oct. 11, 2011

(54) TECHNIQUES FOR SELECTING CALENDAR EVENTS BY EXAMINING CONTENT OF USER'S RECENT E-MAIL ACTIVITY

(75) Inventors: Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1247 days.

(21) Appl. No.: 11/684,654

(22) Filed: Mar. 12, 2007

(65) Prior Publication Data
US 2008/0228548 A1 Sep. 18, 2008

(51) Int. Cl.
*G06Q 10/00* (2006.01)
(52) U.S. Cl. ............... 705/7.19; 705/7.16; 705/7.18
(58) Field of Classification Search ............ 705/7.19, 705/7.16, 7.18
See application file for complete search history.

(56) References Cited

U.S. PATENT DOCUMENTS

| | | | | |
|---|---|---|---|---|
| 4,807,154 | A * | 2/1989 | Scully et al. | 715/751 |
| 4,977,520 | A * | 12/1990 | McGaughey et al. | 715/753 |
| 7,664,740 | B2 * | 2/2010 | Starbuck et al. | 707/999.003 |
| 7,693,817 | B2 * | 4/2010 | Dumais et al. | 707/999.002 |
| 7,693,825 | B2 * | 4/2010 | Wang et al. | 707/723 |
| 7,899,866 | B1 * | 3/2011 | Buckingham et al. | 709/206 |
| 2003/0204474 | A1 * | 10/2003 | Capek et al. | 705/64 |
| 2003/0217073 | A1 * | 11/2003 | Walther et al. | 707/104.1 |
| 2005/0057584 | A1 | 3/2005 | Gruen et al. | |
| 2005/0114457 | A1 * | 5/2005 | Shih | 709/206 |
| 2006/0212330 | A1 * | 9/2006 | Savilampi | 705/8 |
| 2006/0282328 | A1 * | 12/2006 | Gerace et al. | 705/14 |
| 2007/0027852 | A1 * | 2/2007 | Howard et al. | 707/3 |
| 2007/0174244 | A1 * | 7/2007 | Jones | 707/3 |
| 2007/0285502 | A1 * | 12/2007 | Yee | 348/14.08 |
| 2008/0082925 | A1 * | 4/2008 | Brush et al. | 715/744 |

OTHER PUBLICATIONS

Lin, M.. At the right place at the right time—Digital support for personal time management. Ph.D. dissertation, University of Maryland, Baltimore County, United States—Maryland. Retrieved Dec. 4, 2010, from Dissertations & Theses: Full Text.(Publication No. AAT 3291002).*

(Continued)

*Primary Examiner* — Scott L Jarrett
*Assistant Examiner* — George H Walker
(74) *Attorney, Agent, or Firm* — Dillon & Yudell LLP

(57) ABSTRACT

A system and method for selecting calendar events based on examining the content of a user's recent e-mail activity. According to an embodiment of the present invention, a scheduling manager assembles a keyword list, wherein the keyword list includes a collection of keywords with associated weights for each keyword among the collection of keywords. If the scheduling manager detects at least two conflicting calendar events scheduled within a calendar program, the scheduling manager searches the at least two conflicting calendar events for at least one keyword on the keyword list. The scheduling manager computes a keyword weight score for each of the at least two conflicting calendar events. If one calendar event among the at least two conflicting calendar events has a highest keyword weight score, the scheduling manager schedules the one calendar event within the calendar program.

9 Claims, 8 Drawing Sheets

OTHER PUBLICATIONS

Aron Culotta, Ron Bekkerman and Andrew McCallum. "Extracting social networks and contact information from email and the Web." 2004, Computer Science Department Faculty Publication Series, University of Massachusetts—Amherst, ScholarWorks@UMass Amherst.*

Henry Lieberman, Christopher Fry and Louis Weitzman. "Exploring the Web with Reconnaissance Agents." Communications of the ACM, Aug. 2001/vol. 44, No. 8.*

Simone Stumpf, Vidya Rajaram, Lida Li, Margaret Burnett, Thomas Dietterich, Erin Sullivan, Russell Drummond, and Jonathan Herlocker. 2007. Toward harnessing user feedback for machine learning. In Proceedings of the 12th international conference on Intelligent user interfaces (IUI '07). ACM, New York, NY. DOI=10.1145/1216295.1216316 http://doi.acm.*

Biju Issac; Valliappan Raman; , "Spam Detection Proposal in Regular and Text-based Image Emails," TENCON 2006. 2006 IEEE Region 10 Conference , vol., No., pp. 1-4, Nov. 14-17, 2006 doi: 10.1109/TENCON.2006.343905 URL: http://ieeexplore.ieee.org/stamp/stamp.jsp?tp=&arnumber=4142536&isnumber=4142121.*

Liaquat, Hossain; Wu, Andre; and Choi, Byounggu, "Measuring Coordination through Social Networks" (2006). ICIS 2006 Proceedings. Paper 72. http://aisel.aisnet.org/icis2006/72.*

Andrew Cencini. "SQL Server 2005 Full-Text Search: Internals and Enhancements." Dec. 2003, revised May 2006. Downloaded May 11, 2011 from http://msdn.microsoft.com/en-us/library/ms345119(d=printer,v=sql.90).aspx.*

Gabor Cselle, Keno Albrecht, and Roger Wattenhofer. 2007. BuzzTrack: topic detection and tracking in email. In Proceedings of the 12th international conference on Intelligent user interfaces (IUI '07). ACM, New York, NY, USA, 190-197. DOI=10.1145/1216295.1216331 http://doi.acm.org/10.1145/1216295.1216331.*

Ville H. Tuulos, Jukka Perki\&\#246;, and Henry Tirri. 2005. Multi-faceted information retrieval system for large scale email archives. In Proceedings of the 28th annual international ACM SIGIR conference on Research and development in information retrieval (SIGIR '05). ACM, New York, NY, USA, 683-683. DOI=10.1145/1076034.1076195 http://doi.acm.org.*

Jim Boyce. Microsoft® Office Outlook® 2003 Inside Out. Chapter 8 Filtering, Organizing, and Using Automatic Responses . Microsoft Press 2004.*

Geyer, W. et al. "Supporting Activity-centric Collaboration through Peer-to-Peer Shared Objects," *Group '03*, Nov. 9-12, 2003, pp. 115-124, Sanlbel Island, Florida, USA.

Harrison, B.L. et al. "Role and Relationships for Unified Activity Management," *Group '05*, Nov. 6-9, 2005, pp. 236-245, Sanibel Island, Florida, USA.

Kobayashi, M. et al. "Information Retrieval on the Web," ACM Computing Surveys, vol. 32, No. 2, Jun. 2000, pp. 144-173.

Robinson, W.N. et al. "Requirements Interaction Management," ACM Computing Surveys, vol. 35, No. 2, Jun. 2003, pp. 132-190.

* cited by examiner

FIGURE 3B

| Order Invite Received 310 | Calendar Entry 312 | Meeting Subject 314 | Assigned Keyword 1 and Weight 316 | Assigned Keyword 2 and Weight 318 |
|---|---|---|---|---|
| 1 | Monday, 9 AM | B4RS Department Budget Discussion | B4RS = 10 | Budget = 2 |
| 2 | Monday, 9 AM | PBC Tool Updates with HR | PBC = 5 | HR = 2 |

320

FIGURE 3C

| From 320 | Date 322 | Time 324 | Subject 326 | Email Keyword Match to Calendar 328 |
|---|---|---|---|---|
| Sally | Sunday, January 21, 2007 | 6:00 PM | Important that you attend tomorrow's budget meeting | Budget |
| Fred | Saturday, January 20, 2007 | 1:00 PM | Final draft of charts for B4RS budget meeting | B4RS, Budget |
| Joe | Friday, January 19, 2997 | 2:00 PM | Don't forget we have the budget meeting next Monday | Budget |
| HR | Friday, January 19, 2007 | 4:00 PM | Link to PBC chars | PBC, HR |
| Fred | Thursday, January 18, 2007 | 9:00 AM | First draft of charts to B4RS budget meeting | B4RS, Budget |

| Order Invite Received 332 | Calendar Entry 334 | Keyword 1 score 336 | Keyword 2 score 340 | Score 342 | Calendar Result 344 |
|---|---|---|---|---|---|
| 1 | Monday, January 22, 2007, 9AM | B4RS - 20 | Budget – 80 | 100 | Invitation accepted |
| 2 | Monday, January 22, 2007 | PBC – 5 | HR – 5 | 10 | Invitation declined |

346

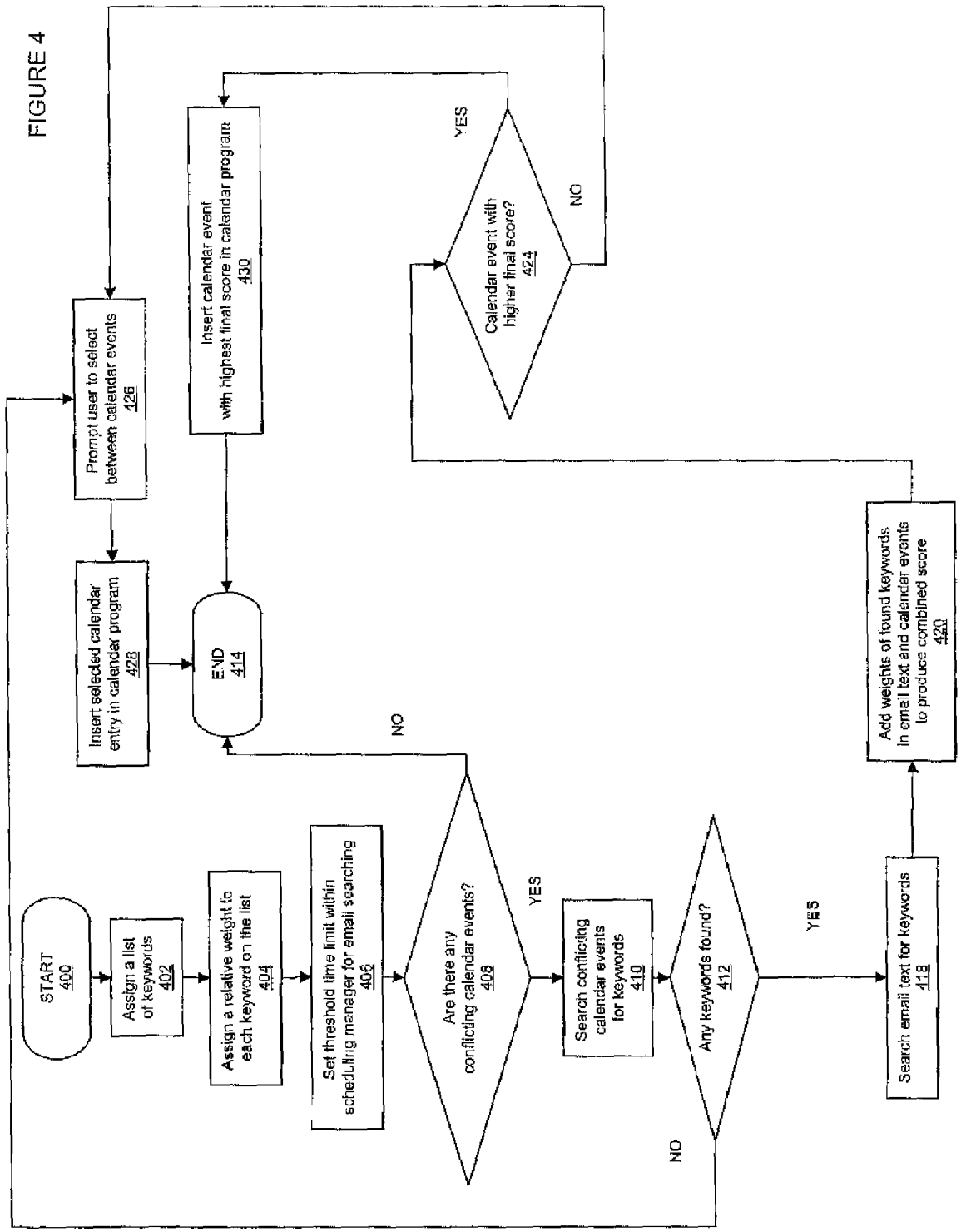

TECHNIQUES FOR SELECTING CALENDAR EVENTS BY EXAMINING CONTENT OF USER'S RECENT E-MAIL ACTIVITY

BACKGROUND OF THE INVENTION

1. Technical Field

The present invention relates in general to the field of data processing systems, and more particularly, the field of increasing scheduling efficiency utilizing data processing systems.

2. Description of the Related Art

The advent of the computer has facilitated the exchange of information and has transformed modern work environments via the use of applications such as word processors, spreadsheets, databases, etc. While a stand-alone computer with word processing, spreadsheet, and database applications installed enables a user to quickly enter and process information, networked computers facilitate the rapid exchange of information via a network, such as the Internet. A user typically navigates and exchanges information over the network through the use of web browsers, e-mail clients, file transfer protocol (FTP) clients, and other types of communication applications. The use of networks such as the Internet as a communication medium enables users to communicate from remote locations, reducing the need for costly face-to-face meetings.

With increased reliance on network-based work environments, software applications have been developed to enhance the efficiency and productivity of workers. One type of application that has emerged is an electronic calendar, also known as a "personal information and time manager". Some personal information and time managers are coupled with e-mail clients such as Microsoft Outlook™. Coupling e-mail clients with personal information and time managers enable users to send and receive e-mail messages and schedule appointments in the same application interface. Also, a user can immediately make an appointment in response to an c-mail message with a combined interface offered by Outlook™.

Lotus Organizer™ is one example of a popular electronic, personal information and time manager for scheduling appointments, making to-do lists, maintaining address lists, managing contacts, and more. The multi-access, multi-user database format utilized in Organizer™ allows multiple users to share the same file for group calendar planning, contacts, and task management. Organizer™ has a group scheduling feature that enables a user to schedule a meeting and invite other users to attend. Often, meetings may be set for the same time or overlapping times. A user must mentally prioritize between overlapping meetings and manually accept or decline meeting invitations. Therefore, there is a need for a system and method of automating calendar entry selections to address the aforementioned limitations.

SUMMARY OF THE INVENTION

The present invention relates to a system and method for selecting calendar events based on examining the content of a user's recent e-mail activity. According to an embodiment of the present invention, a scheduling manager assembles a keyword list, wherein the keyword list includes a collection of keywords with associated weights for each keyword among the collection of keywords. If the scheduling manager detects at least two conflicting calendar events scheduled within a calendar program, the scheduling manager searches the at least two conflicting calendar events for at least one keyword on the keyword list. The scheduling manager computes a keyword weight score for each of the at least two conflicting calendar events. If one calendar event among the at least two conflicting calendar events has a highest keyword weight score, the scheduling manager schedules the one calendar event within the calendar program.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself; however, as well as a preferred mode of use, further purposes and advantages thereof, will best be understood by reference to the following detailed description of an illustrative embodiment when read in conjunction with the accompanying figures, wherein:

FIG. 3B is a calendar entry selection menu generated by the scheduling manager shown FIG. 2;

FIG. 3C is an e-mail selection menu generated by scheduling manager illustrated in FIG. 2;

FIG. 3D is a calendar entry selection menu generated by the scheduling manager depicted in FIG. 2; and FIG. 4 is a high-level logical flowchart illustrating an exemplary method for selecting calendar events by examining content of user's recent e-mail according to an embodiment of the present invention.

DETAILED DESCRIPTION OF AN ILLUSTRATIVE EMBODIMENT

The present invention relates to a system and method for selecting calendar events based on examining the content of a user's recent e-mail activity. According to an embodiment of the present invention, a scheduling manager assembles a keyword list, wherein the keyword list includes a collection of keywords with associated weights for each keyword among the collection of keywords. If the scheduling manager detects at least two conflicting calendar events scheduled within a calendar program, the scheduling manager searches the at least two conflicting calendar events for at least one keyword on the keyword list. The scheduling manager computes a keyword weight score for each of the at least two conflicting calendar events. If one calendar event among the at least two conflicting calendar events has a highest keyword weight score, the scheduling manager schedules the one calendar event within the calendar program.

Figure 1A:
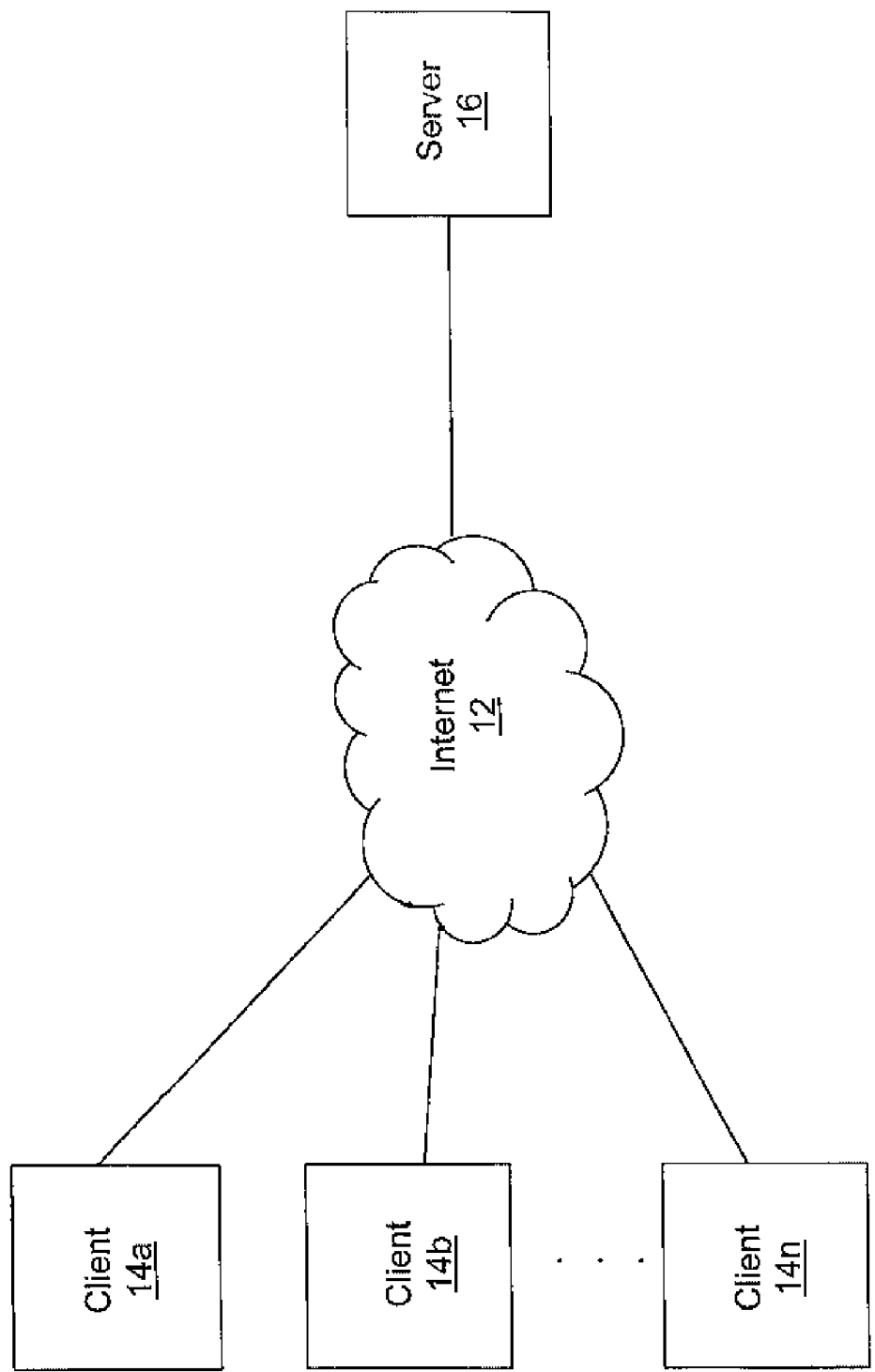
FIG. 1A is a block diagram illustrating an exemplary network in which an embodiment of the present invention may be implemented.

Referring now to the figures, and in particular, referring to FIG. 1A, there is illustrated a block diagram depicting an exemplary network 10 in which an embodiment of the present invention may be implemented. As illustrated, network 10 includes a collection of clients 14a-14n, Internet 12, and server 16. Clients 14a-14n are coupled to server 16 via Internet 12. While Internet 12 is utilized to couple clients 14a-14n to server 16, those with skill in the art will appreciate that a local-area network (LAN) or wide-area network (WAN) utilizing Ethernet, IEEE 801.11x, or any other communications protocol may be utilized. Clients 14a-14n and server 16 are discussed in more detail in conjunction with FIG. 1B. Those with skill in the art will appreciate that exemplary network 10 may include other components such as routers, firewalls, etc. that are not germane to the discussion of the present network and will not be discussed further herein.

In an embodiment of the present invention, server 16 may operate as an e-mail server utilizing any well-known communications protocol in the art including, but not limited to, simple mail transfer protocol (SMTP), post office protocol (POP) or any other communications protocol. Via server 16, clients 14a-14n may send e-mail messages to each other or to other computers coupled to Internet 12.

Figure 1B:
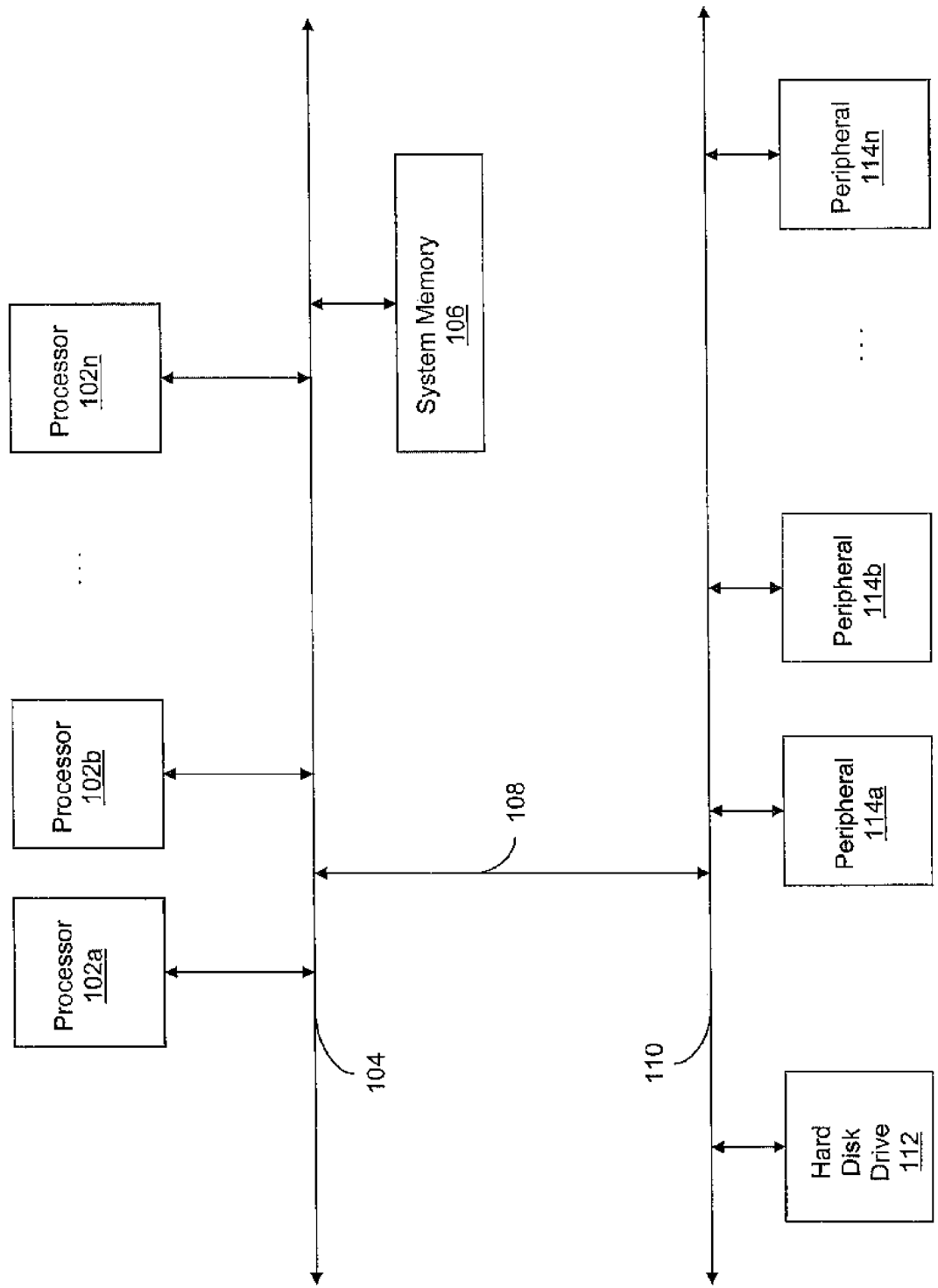
FIG. 1B is a block diagram depicting an exemplary data processing system in which an embodiment of the present invention may be implemented.

FIG. 1B is a block diagram depicting an exemplary data processing system 100 which may be utilized to implement clients 14a-14n and server 16 as shown in FIG. 1A. As illustrated, exemplary data processing system 100 includes a collection of processors 102a-102n that are coupled to system memory 106 via a system bus 104. System memory 104 may be implemented by dynamic random access memory (DRAM) modules or any other type of random access memory (RAM) module. Mezzanine bus 108 couples system bus 104 to peripheral bus 110. Coupled to peripheral bus 110 is a hard disk drive 112 for mass storage and a collection of peripherals 114a-114n, which may include, but are not limited to, optical drives, other hard disk drives, printers, input devices, network adapters, etc.

Those with skill in the art will appreciate that data processing system 100 can include many additional components not specifically illustrated in FIG. 1B. Because such additional components are not necessary for an understanding of the present invention, they are not illustrated in FIG. 1B or discussed further herein. It should be understood, however, that the enhancements to data processing system 100 provided by the present invention are applicable to data processing systems of any system architecture and are in no way limited to the generalized multi-processor architecture illustrated in FIG. 1B.

Figure 2:
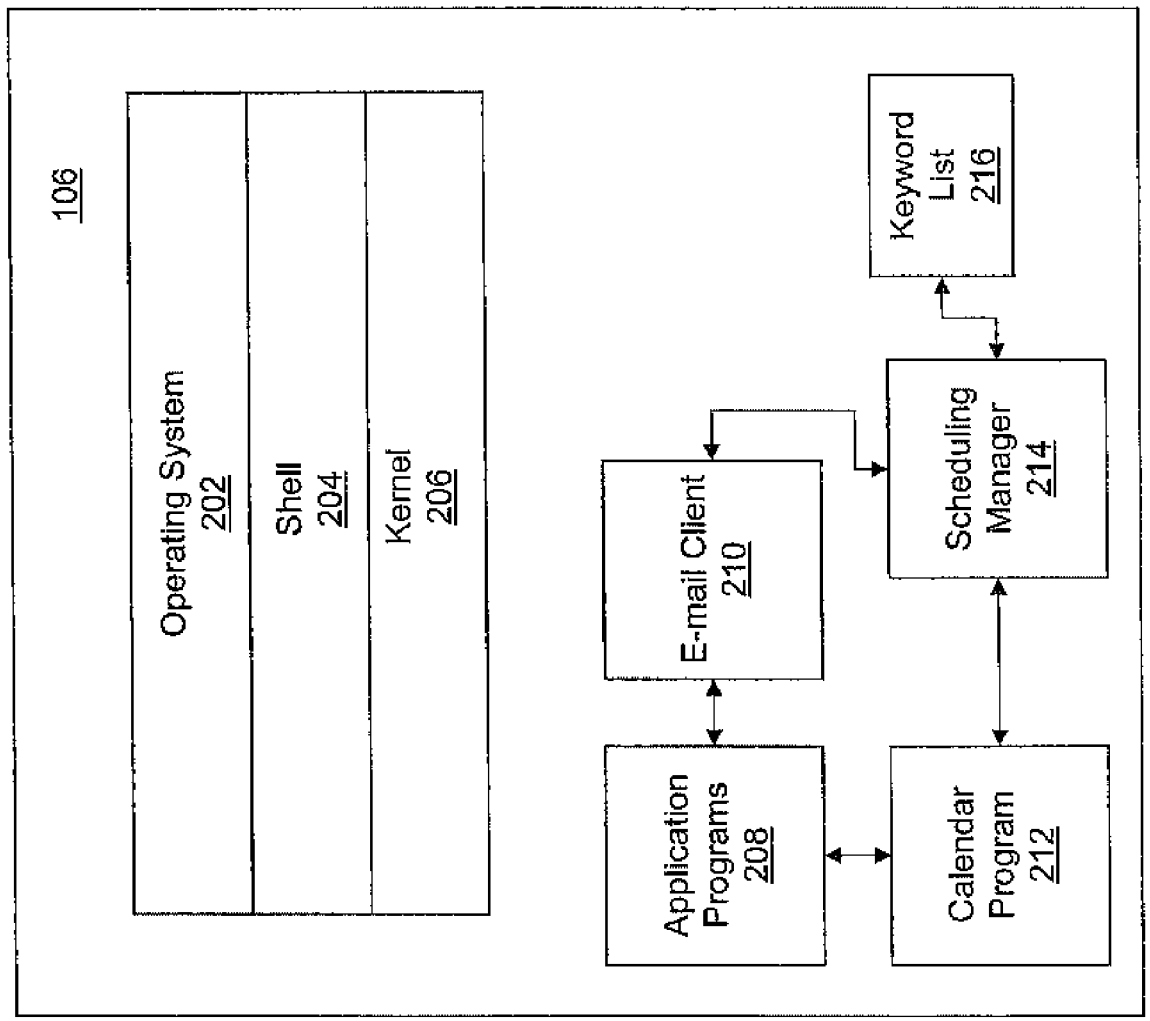
FIG. 2 is a block diagram illustrating exemplary contents of system memory according to an embodiment of the present invention.

FIG. 2 is a block diagram illustrating exemplary contents of system memory 106 of data processing system 100, according to an embodiment of the present invention. As shown, system memory 106 includes operating system 202, which further includes shell 204 (as it is called in UNIX®) for providing transparent user access to resources such as application programs 208. Generally, shell 204, also called a command processor in Windows®, is generally the highest level of the operating system software hierarchy and serves as a command interpreter. Shell 204 provides a system prompt, interprets commands entered by keyboard, mouse, or other user input media, and sends the interpreted command(s) to the appropriate lower levels of the operating system (e.g., kernel 206) for processing. Note that while shell 204 is a text-based, line-oriented user interface, the present invention will support other user interface modes, such as graphical, voice, gestural, etc. equally well.

As illustrated, operating system 202 also includes kernel 206, which includes lower levels of functionality for operating system 202 and application programs 208, including memory management, process and task management, disk management, and mouse and keyboard management. Application programs 208 can include a browser utilized for access to Internet 12 (FIG. 1A), word processors, spreadsheets, and other application programs. As depicted in FIG. 2, system memory 106 includes e-mail client 210, calendar program 212, scheduling manager 214, and keyword list 216.

Calendar program 212 operates as an electronic datebook to enable a user to insert calendar events for appointments and keep track of contacts and to-do lists. E-mail client 210 enables a user to send e-mail messages to other users via exemplary network 10. For example, a user may compose an e-mail message utilizing e-mail client 210. A client 14a-14n sends the e-mail message to server 16 via Internet 12. The intended e-mail recipient later retrieves the e-mail message from server 16 via Internet 12 and stores the received e-mail message in a corresponding e-mail client 210.

Keyword list 216 is a list of user-designated keywords and associated numerical weights. Scheduling manager 214 utilizes keyword list 216 to select between calendar events in the case of a calendar event conflict (i.e., more than one calendar event scheduled for the same or overlapping times). The selection of calendar events in the case of a calendar event conflict involves scheduling manager 214 searching the conflicting calendar events for user-designated keywords that appear on keyword list 216. Then, scheduling manager 214 searches e-mail messages within e-mail client 210 for the same keywords found within the conflicting calendar events. Scheduling manager 214 calculates a keyword weight score for each conflicting calendar event. Scheduling manager 214 accepts a calendar event invitation associated with the calendar event with the highest keyword weight score to resolve the calendar event conflict. The operation of scheduling manager 214, keyword list 216, e-mail client 210, and calendar program 212 is discussed in more detail in conjunction with FIG. 4.

Figure 3A:
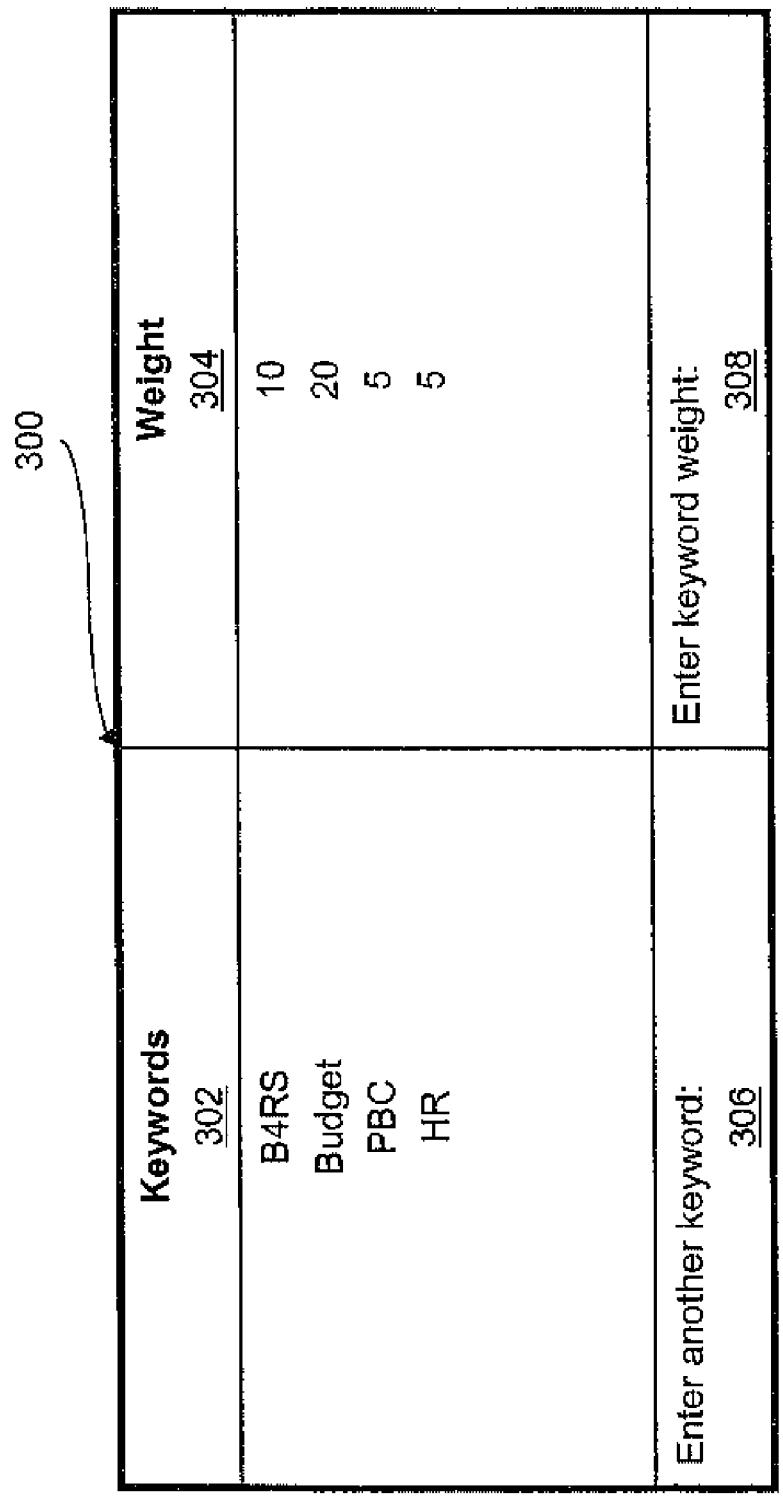
FIG. 3A is a keyword selection menu generated by the scheduling manager depicted in FIG. 2.

FIG. 3A depicts a keyword selection menu 300 generated by scheduling manager 214 shown in FIG. 2. As illustrated, keyword selection menu 300 includes two columns, keywords list 302 and weight list 304. A user utilizes keyword entry field 306 to add desired keywords to keywords list 302. Subsequently, the user may utilize weight entry field 308 to associate a numerical weight to the keyword entered in keyword entry field 306. Once the user completes entry of keywords and associated weights, the entered keywords and associated weights are transferred to keyword list 216 (FIG. 2). The operation of the selection menus shown in FIGS. 3A-3D are described in more detail in conjunction with FIG. 4.

FIG. 3B is a calendar entry selection menu 320 generated by scheduling manager 214 (FIG. 2) when a calendar event conflict occurs. Calendar entry selection menu 320 includes multiple columns such as order invite received column 310, calendar entry column 312, meeting subject column 314, assigned keyword 1 and weight column 316 and assigned keyword 2 and weight column 318. As illustrated in calendar entry selection menu 320, scheduling manager 214 detects a calendar event conflict between two calendar events scheduled for 9 AM on Monday.

FIG. 3C is an e-mail selection menu 330 generated by scheduling manager 214 (FIG. 2) after searching recent e-mail activity within e-mail client 210. As illustrated, e-mail selection menu 330 includes from field 320, which indicates the sender of the e-mail message, a date field 322 and a time field 324, which indicate the date and time the e-mail message was sent, subject field 326, which indicates the subject of the e-mail message, and e-mail keyword match to calendar field 328, which indicates which keywords from keyword list 216 were found in calendar events indicated in invitation menu 320 and the listed e-mail messages.

FIG. 3D is a calendar entry selection menu 346 generated by scheduling manager 214 (FIG. 2) that indicates which calendar event is accepted to resolve the calendar event conflict. As depicted, calendar entry selection menu 346 includes order invite received field 332, calendar entry field 334, keyword 1 score field 336, keyword 2 score field 340, score field 342, and calendar result field 344.

FIG. 4 is a high-level logical flowchart illustrating an exemplary method for selecting calendar events by examining the content of user's recent e-mail according to an embodiment of the present invention. Generally, scheduling manager 214 (FIG. 2) presents a series of selection menus (FIGS. 3A-3D) to enable a user to facilitate selection between calendar events scheduled at the same time within calendar program 212. Scheduling manager 214 presents a keyword selection menu 300 (FIG. 3A). A user enters keywords and associates a numeric weight value to those entered keywords. After the user completes keyword entry, scheduling manager 214 saves the keywords and associated values in keyword list 216. For example, keyword list 216 includes the keywords of "B4RS", with a weight of "10", "Budget", with a weight of "20", "PBC", with a weight of "5", and "HR", also with a weight of "5".

When scheduling manager 214 detects that more than one calendar event has been scheduled within calendar program 212 at the same time or at overlapping times, scheduling manager 214 presents calendar entry selection menu 320 (FIG. 3B) which presents to the user information regarding calendar events that have been scheduled at the same time (e.g., conflicting calendar events), including any keywords from keyword list 216 that are found within the events. For example, of the two conflicting calendar events shown in FIG. 3B, the first calendar event includes the keywords of "B4RS" and "Budget". The second calendar event includes the keywords of "PBC" and "HR".

To select a calendar event among conflicting calendar events, scheduling manager 214 searches recently composed or received e-mail messages that include keywords found with the calendar events presented in calendar entry selection menu 320 (FIG. 3B). A way of measuring the relative priority of conflicting calendar events is to examine recent e-mail messages and determine who often certain keywords are used in the user's recent e-mail communication. For example, referring to FIG. 3C, e-mail selection menu indicates five e-mail messages that include keywords that match the keywords found in the conflicting calendar events, as shown in e-mail keyword match to calendar field 328.

Scheduling manager 214 then calculates a keyword weight score for each conflicting calendar event, discussed in more detail in conjunction with FIG. 4. For example, referring to FIG. 3D, the first calendar entry has a keyword weight score of "100", since "Budget" with a weight of "20" was mentioned 4 times in recent e-mail messages and "B4RS" with a weight of "10" was mentioned 2 times in recent e-mail messages.

After calculating the keyword weight score for each conflicting calendar event, scheduling manager 214 displays a second calendar entry selection menu 346 (FIG. 3D), which indicates the chosen calendar event based on the calculated keyword weight score. Scheduling manager 214 enters the chosen calendar event as the scheduled calendar event by accepting the associated invitation and declining the invitation of the calendar events that were not chosen. For example, still referring to FIG. 3D, the first calendar entry is scheduled because the first calendar entry has a higher keyword weight score than the second calendar entry (i.e., 100>10).

Referring back to FIG. 4, the process begins at step 400 and proceeds to step 402, which illustrates a user assigning a list of keywords utilizing keyword field 306 within keyword selection menu 300. The process continues to step 404, which illustrates a user assigning a relative numerical weight scores to keywords utilizing keyword weight field 308 (see FIG. 3A). The process proceeds to step 406, which depicts an optional step of setting a threshold time limit within scheduling manager 214 for e-mail searching. For example, if there are a large number of e-mails stored within e-mail client 210, a user may want to limit the search of keywords within the e-mails to a certain set of e-mails (i.e., only look at e-mails received within a predetermined time such as from the past week, month, etc.).

The process continues to step 408, which shows scheduling manager 214 determining if there are any conflicting calendar events scheduled in calendar program 212. As previously discussed, conflicting calendar events are calendar events that are scheduled to occur at the same time or overlapping times within calendar program 212. For example, referring back to FIG. 3B, both calendar events are scheduled to occur at 9 AM on Monday.

If scheduling manager 214 determines that there are no conflicting calendar events, the process ends, as illustrated in step 414. However, if there are conflicting calendar events within calendar program 212, the process continues to step 410, which shows scheduling manager 214 searching the conflicting calendar events for keywords found on keyword list 216. As shown in FIG. 3B, scheduling manager 214 has found four keywords (B4RS, Budget, PBC, and HR) within the conflicting calendar events. Calendar entry selection menu 320 displays both the keywords and the weights assigned to the keywords within assigned keyword 1 and weight field 316 and assigned keyword 2 and weight field 318. If there are no keywords found, the process continues to step 426, which illustrates scheduling manager 214 prompting a user to select between conflicting calendar events. The process proceeds to step 428, which shows scheduling manager 214 inserting the selected calendar event in calendar program 212. The process ends, as illustrated in step 414.

However, returning to step 412, if there are keywords found within conflicting calendar entries, the process proceeds to step 418, which depicts scheduling manager 214 searching recent e-mail text for keywords. The process continues to step 420, which shows scheduling manager 214 adding weights of keywords found within e-mail text and calendar events to produces a combined keyword weight score for each calendar event. Referring back to FIGS. 3C and 3D, scheduling manager 214 has found keywords "budget", "B4RS", "PBC" and "HR" within the illustrated e-mail messages in FIG. 3C. In FIG. 3D, the combined keyword weight score is illustrated in score field 342.

As a sample calculation, note that calendar event 1 "B4RS Department Budget Discussion" includes two keywords located on keyword list 216—"B4RS" and "Budget". As illustrated in FIG. 3A, "B4RS" has a weight of 10, while "Budget" has a weight of 20. Referring now to e-mail keyword match to calendar field 328 in FIG. 3C, "B4RS" is mentioned two times, while "Budget" is mentioned four times. Therefore, the calculation of the keyword weight score for calendar event 1 "B4RS Department Budget Discussion" is Keyword 1 ("B4RS") score (2×10=20) plus Keyword 2 ("Budget") score (4×20=80) or a keyword weight score of "100".

Referring back to FIG. 4, once scheduling manager 214 calculates the keyword weight scores for each calendar event, the process continues to step 424, which shows scheduling manager 214 determining if a calendar event has a highest keyword weight score. If not, the process continues to step 426. If there is a calendar event with a higher keyword weight score, the process continues to step 430, which illustrates scheduling manager 214 inserting that calendar event within calendar program 212. The process ends, as illustrated in step 414.

As discussed, the present invention relates to a system and method for selecting calendar events based on examining the content of a user's recent e-mail activity. According to an embodiment of the present invention, a scheduling manager assembles a keyword list, wherein the keyword list includes a collection of keywords with associated weights for each keyword among the collection of keywords. If the scheduling manager detects at least two conflicting calendar events scheduled within a calendar program, the scheduling manager searches the at least two conflicting calendar events for at least one keyword on the keyword list. The scheduling manager computes a keyword weight score for each of the at least two conflicting calendar events. If one calendar event among the at least two conflicting calendar events has a highest keyword weight score, the scheduling manager schedules the one calendar event within the calendar program.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method for prioritizing a plurality of calendar events, said method comprising:
    assembling, using a data processing system, a keyword list, wherein said keyword list includes a plurality of keywords with associated weights for each keyword among said plurality of keywords;
    in response to a scheduling manager detecting, using the data processing system, at least two conflicting calendar events scheduled within a calendar program, searching said at least two conflicting calendar events for at least one keyword on said keyword list;
    searching, using the data processing system, e-mail messages received within a predetermined time for said at least one keyword on said keyword list, wherein said predetermined time is specified by a threshold time limit within said scheduling manager;
    computing, using the data processing system, a keyword weight score for each of said at least two conflicting calendar events based on a frequency of said at least one keyword in said e-mail messages;
    in response to at least one calendar event among said at least two conflicting calendar events having a highest keyword weight score, scheduling, using the data processing system, said at least one calendar event within said calendar program; and
    in response to none of said at least two conflicting calendar events having said highest keyword weight score, prompting, using the data processing system, a user to select a calendar event among said at least two conflicting calendar events, wherein said keyword list is a user-assembled keyword list.

2. The method according to claim 1, wherein said computing further comprises:
    adding said associated weights of said at least one keyword in said e-mail messages and said at least two conflicting calendar events to produce a combined score.

3. The method according to claim 1, further comprising:
    in response to no keywords on said keyword list being found in said at least two conflicting calendar events, prompting a user to select a calendar event among said at least two conflicting calendar events.

4. A system for prioritizing a plurality of calendar events, said system comprising:
    a plurality of processors;
    a databus coupled to said plurality of processors; and
    a computer usable storage medium embodying computer program code, said computer usable storage medium being coupled to said databus, said computer program code comprising instructions executable by said plurality of processors and configured for:
        assembling a keyword list, wherein said keyword list includes a plurality of keywords with associated weights for each keyword among said plurality of keywords;
        in response to a scheduling manager detecting at least two conflicting calendar events scheduled within a calendar program, searching said at least two conflicting calendar events for at least one keyword on said keyword list;
        searching e-mail messages received within a predetermined time for said at least one keyword on said keyword list, wherein said predetermined time is specified by a threshold time limit within said scheduling manager;
        computing a keyword weight score for each of said at least two conflicting calendar events based on a frequency of said at least one keyword in said e-mail messages;
        in response to at least one calendar event among said at least two conflicting calendar events having a highest keyword weight score, scheduling said at least one calendar event within said calendar program; and
        in response to none of said at least two conflicting calendar events having said highest keyword weight score, prompting a user to select a calendar event among said at least two conflicting calendar events, wherein said keyword list is a user-assembled keyword list.

5. The system according to claim 4, wherein said computer program code comprising instructions executable by said plurality of processors and configured for said computing further comprises computer program code for:
    adding said associated weights of said at least one keyword in said e-mail messages and said at least two conflicting calendar events to produce a combined score.

6. The system according to claim 4, wherein said instructions are further configured for:
    in response to no keywords on said keyword list being found in said at least two conflicting calendar events, prompting a user to select a calendar event among said at least two conflicting calendar events.

7. A computer usable storage medium embodying computer program code, said computer program code comprising executable instructions configured for:
- assembling a keyword list, wherein said keyword list includes a plurality of keywords with associated weights for each keyword among said plurality of keywords;
- in response to a scheduling manager detecting at least two conflicting calendar events scheduled within a calendar program, searching said at least two conflicting calendar events for at least one keyword on said keyword list;
- searching e-mail messages received within a predetermined time for said at least one keyword on said keyword list, wherein said predetermined time is specified by a threshold time limit within said scheduling manager;
- computing a keyword weight score for each of said at least two conflicting calendar events based on a frequency of said at least one keyword in said e-mail messages;
- in response to at least one calendar event among said at least two conflicting calendar events having a highest keyword weight score, scheduling said at least one calendar event within said calendar program; and
- in response to none of said at least two conflicting calendar events having said highest keyword weight score, prompting a user to select a calendar event among said at least two conflicting calendar events, wherein said keyword list is a user-assembled keyword list.

8. The computer usable storage medium according to claim 7, wherein said instructions are further configured for:
- adding said associated weights of said at least one keyword in said e-mail messages and said at least two conflicting calendar events to produce a combined score.

9. The computer usable storage medium according to claim 7, wherein said instructions are further configured for:
- in response to no keywords on said keyword list being found in said at least two conflicting calendar events, prompting a user to select a calendar event among said at least two conflicting calendar events.

* * * * *